United States Patent [19]

Chaplin et al.

[11] Patent Number: 5,114,787
[45] Date of Patent: May 19, 1992

[54] MULTI-LAYER NONWOVEN WEB COMPOSITES AND PROCESS

[75] Inventors: Mitchell E. Chaplin, Powder Springs; Geraldine M. Eaton, Acworth; Brian A. Hickie, Atlanta; Peter W. Pascavage, Marietta; Jessie Tyson, Clarkston, all of Ga.

[73] Assignee: Amoco Corporation, Chicago, Ill.

[21] Appl. No.: 704,816

[22] Filed: May 23, 1991

Related U.S. Application Data

[63] Continuation-in-part of Ser. No. 483,113, Sep. 21, 1990.

[51] Int. Cl.⁵ .......................................... B32B 27/34
[52] U.S. Cl. ....................................... 428/284; 28/104; 156/219; 156/220; 156/308.2; 428/287; 428/296; 428/297; 428/298; 428/299; 604/365
[58] Field of Search ............... 428/284, 287, 296, 297, 428/298, 299; 156/219, 220, 308.2; 28/104; 604/365

[56] References Cited

U.S. PATENT DOCUMENTS

| | | | |
|---|---|---|---|
| 4,275,105 | 6/1981 | Boyd et al. | 428/198 |
| 4,340,563 | 7/1982 | Appel et al. | 264/518 |
| 4,790,736 | 12/1988 | Keuchel | 425/66 |
| 4,824,498 | 4/1989 | Goodwin et al. | 156/71 |
| 4,832,852 | 5/1989 | Wells et al. | 210/671 |
| 4,850,990 | 7/1989 | Huntoon et al. | 604/385.2 |

Primary Examiner—James J. Bell
Attorney, Agent, or Firm—Robert G. Ladd; William H. Magidson; Frank J. Sroka

[57] ABSTRACT

A multi-layer nonwoven web composite comprising at least one layer of a self-bonded, fibrous, nonwoven web bonded to at least one layer of a carded web having improved cross-machine direction tensile strength per unit of composite basis weight and improved rewet properties and processes for producing same.

20 Claims, 2 Drawing Sheets

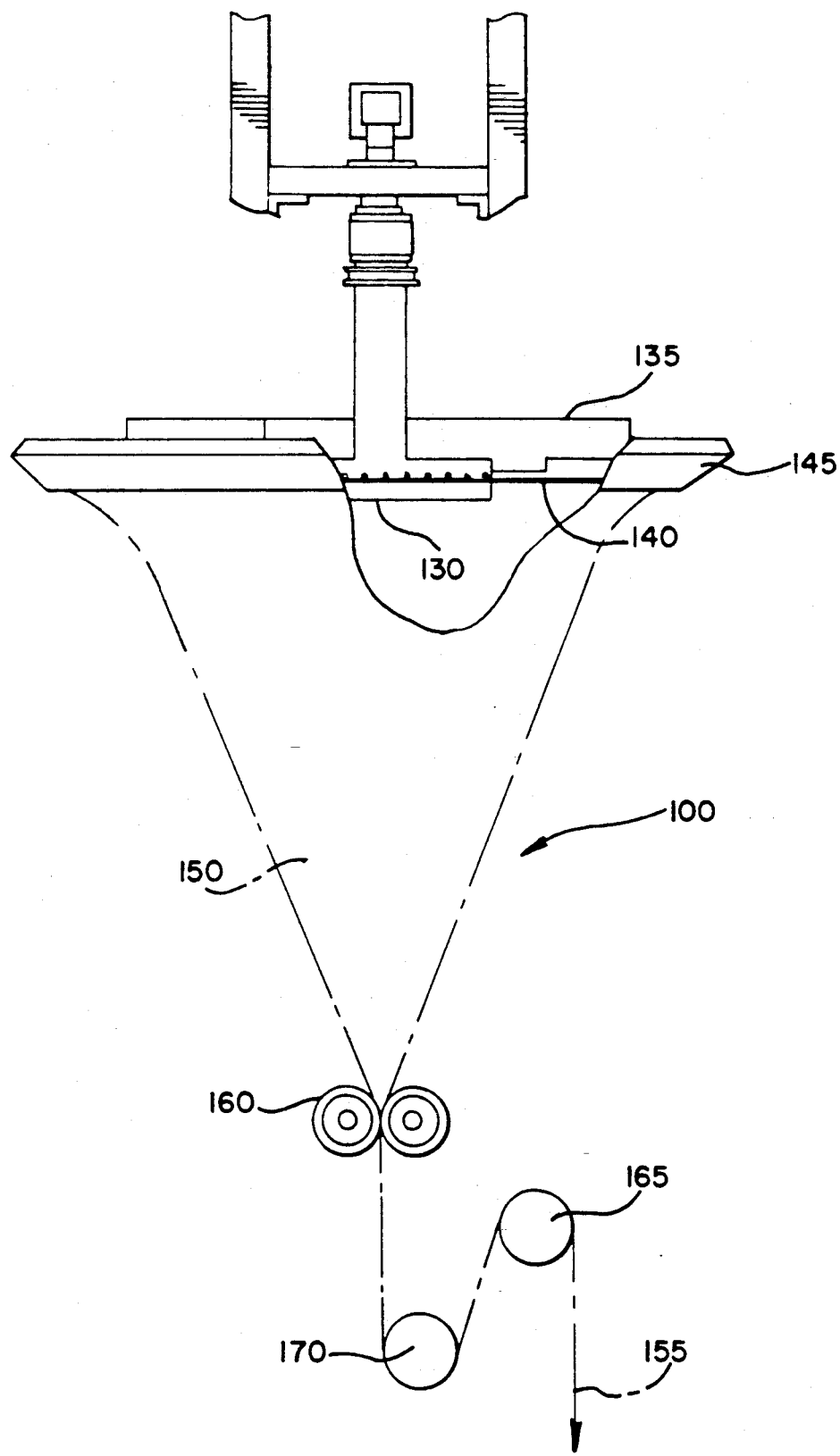
FIG_2_

MULTI-LAYER NONWOVEN WEB COMPOSITES AND PROCESS

CROSS-REFERENCE TO RELATED APPLICATION

This application is a continuation-in-part application of U.S. Ser. No. 483,113 filed Feb. 21, 1990 is now pending.

FIELD OF INVENTION

This invention relates to multi-layer nonwoven web composites comprising at least one layer of a uniform basis weight, self-bonded, fibrous, nonwoven web comprising substantially randomly disposed, substantially continuous filaments adhered to at least one layer of a carded web of staple fibers and processes for producing these composites.

BACKGROUND OF THE INVENTION

Composites of spunbonded nonwoven webs and carded nonwoven webs are known for a wide variety of end uses such as wipes, diaper and hygienic product coverstock, protective apparel applications, and the like.

Spunbonded polymeric nonwoven webs can be produced by extruding polymer through a die to form a multiplicity of continuous thermoplastic polymer strands as the polymer exits holes in the die in a generally downward direction onto a moving surface where the extruded strands are collected in a randomly distributed fashion. The randomly distributed strands are subsequently bonded together by thermobonding or by needlepunching to provide sufficient integrity in a resulting nonwoven web of continuous fibers. One method of producing spunbonded nonwoven webs is disclosed in U.S. Pat. No. 4,340,563. Spunbonded webs are characterized by a relatively high strength/weight ratio, high porosity and abrasion resistance properties and are typically non-uniform in such properties as basis weight and coverage.

Carded polymeric nonwoven webs can be produced by a process wherein voluminous masses of staple polymeric fibers are separated by opposed moving beds of closely spaced needles into individual fibers, aligned for the most part in the machine direction and formed into a coherent web.

Self-bonded, fibrous, nonwoven web and carded web composites are generally disclosed in U.S. patent application Ser. No. 556,353, filed on Jul. 20, 1990, in the name of Geraldine M. Eaton, et al., and self-bonded, fibrous, nonwoven web and meltblown composites are disclosed in U.S. patent application Ser. No. 556,354, filed on Jul. 20, 1990, in the name of Paul N. Antonacci, et al., both commonly assigned to the present assignee. No specific details of construction or end use are described for the composites of this invention in those applications.

A major limitation of multi-layer composite laminates of spunbonded and carded nonwoven webs is that the spunbonded web used to impart strength to the carded web layer, especially in the cross-machine direction, is nonuniform in coverage and basis weight. In many applications, attempts are made to compensate for the poor fabric aesthetics and limiting physical properties that result from this nonuniformity of coverage and basis weight by using webs having a greater number of filaments and a heavier basis weight than would normally be required for the particular application if the web had a more uniform coverage and basis weight. This, of course, adds to the cost of the composite product and contributes to greater stiffness and other undesirable composite features.

In view of the limitations of spunbonded nonwoven webs in multi-layer nonwoven spunbonded and carded web composites, there is a need for improved nonwoven web composites and, particularly, those wherein at least one layer of a self-bonded, fibrous nonwoven web having very uniform basis weight and balanced physical properties is adhered to at least one layer of a carded web of staple fibers.

U.S. Pat. No. 4,275,105 discloses absorbent, nonwoven, stabilized webs wherein a carded web of staple length fibers of rayon having a basis weight in the range of about 20 to about 75 $g/m^2$ is bonded to spunbonded webs having basis weights of about 5 to about 25 $g/m^2$ made from polyethylene, polypropylene, ethyl vinyl acetate, ethyl methyl acrylate, polyester, nylon or polyurethane.

U.S. Pat. No. 4,832,852 discloses composites formed by needle punching top and bottom layers of carded webs of cotton to an intermediate layer of a spunbonded synthetic material used in a method of removing oil from a surface contaminated with oil comprising spreading an elongated mat of the composite material on the surface to absorb the oil.

U.S. Pat. No. 4,824,498 discloses laminates used as carpet underlay. In one embodiment, a layer of a spunbonded nylon scrim is adhesively attached to a layer of a carded web of rayon.

U.S. Pat. No. 4,850,990 discloses a disposable diaper with a liquid permeable bodyside liner having a top layer of a pattern bonded, spunbonded web of synthetic fiber such as polypropylene, polyester and the like and a bottom layer of a carded web of polyester/polypropylene fiber bonded together by a thermal or ultrasonic bonding process.

Disposable diaper and hygienic products generally comprise a fibrous nonwoven interlayer, also referred to herein as coverstock, which contacts the wearer's skin, an intermediate layer of absorbent material and an outer impervious backing sheet. Important characteristics of the coverstock are strikethrough, runoff and rewet. Strikethrough is a measure of the ability of the coverstock to pass moisture into the intermediate layer upon initial contact of the moisture. Runoff is a measure of the ability of the coverstock to allow a fluid to pass through it and be absorbed by the intermediate layer. Rewet is a measure of the tendency of moisture to move back from the intermediate layer through the coverstock after initial wetting. Low rewet is required to keep moisture away from the wearer's skin.

A disadvantage of the multi-layer nonwoven web composite disclosed in the patents above is their rewet properties and cross-machine direction tensile strength per unit of basis weight. Thus, there remains a need for multi-layer nonwoven web composites having improved rewet properties and improved cross-machine direction tensile strength per unit of composite basis weight and for processes to make these composites. It is an object of this invention to provide such composites. It is a further object of this invention to provide multi-layer nonwoven web composites comprising at least one layer of a uniform basis weight self-bonded, fibrous web of thermoplastic filaments comprising polypropylene, high density polyethylene, low density polyethylene, linear low density polyethylene, polyamides, polyesters, blends of polypropylene and linear low density polyethylene and at least one layer of a carded web of staple fibers wherein the staple fibers comprise cotton, polypropylene, blends of polypropylene and polybutenes and blends of polypropylene and linear low density polyethylene. A still further object of this invention is to provide processes for preparing these composites. Other objects of this invention will be apparent to persons skilled in the art from the following description and claims.

We have found that the objects of this invention can be attained by providing nonwoven web composites comprising at least one layer of a uniform basis weight, self-bonded, fibrous, nonwoven web comprising a plurality of substantially randomly disposed, substantially continuous thermoplastic filaments wherein the web has a Basis Weight Uniformity Index (BWUI) of $1.0\pm0.05$ determined from average basis weights having standard deviations of less than 10%, adhered to at least one layer of a carded web of staple fibers. With the greater uniformity of basis weight, coverage and tensile strength made available from the self-bonded nonwoven web having a BWUI of $1.0\pm0.05$ determined from average basis weights having standard deviations of less than 10%, lighter basis weight multi-layer nonwoven composites are attainable.

Among the advantages produced by the multi-layered nonwoven web composites and process for producing same of the present invention are improved rewet properties and improved cross-machine direction tensile strength per unit of composite basis weight as compared to carded web. This improvement is achieved due to the very uniform basis weight property of the self-bonded, fibrous nonwoven webs comprising substantially continuous polymeric filaments which enables lower basis weight self-bonded webs to be used to provide strength to the composites. Improved cross-machine direction tensile strength per unit of composite basis weight is achieved due to the excellent cross-machine direction tensile strength and uniform basis weights exhibited by the self-bonded, fibrous, nonwoven webs used in the present invention. Wetness properties of multi-layer nonwoven web composites can be engineered for specific end uses by varying the hydrophobic or hydrophilic nature of each layer of the composite independently by choice of thermoplastic used or by choice of the treating agent used for each layer such as wetting agents or surfactants. Additionally, the use of blends of polypropylene and polybutene and/or linear low density polyethylene provides the multi-layer nonwoven web composites with better hand and improved softness.

SUMMARY OF THE INVENTION

Briefly, the multi-layer nonwoven web composites according to this invention comprise at least one layer of a uniform basis weight self-bonded, fibrous nonwoven web comprising a plurality of substantially randomly disposed, substantially continuous thermoplastic filaments wherein the web has a Basis Weight Uniformity Index (BWUI) of $1.0\pm0.05$ determined from average basis weights having standard deviations of less than 10%, adhered to at least one layer of a carded web of staple fibers. Also, provided are multi-layer nonwoven web composites having a basis weight of about 7 g/m$^2$ or greater comprising, at least one layer of a uniform basis weight self-bonded, fibrous web having a basis weight of about 3.5 g/m$^2$ or greater comprising a plurality of substantially randomly disposed, substantially continuous thermoplastic filaments wherein the thermoplastic is selected from the group consisting of polypropylene, high density polyethylene, low density polyethylene, linear low density polyethylene, polyamides, polyesters, blends of polypropylene and polybutene, and blends of polypropylene and linear low density polyethylene wherein the self-bonded web has a BWUI of $1.0\pm0.05$ determined from average basis weights having standard deviations of less than 10%, adhered to at least one layer of a carded web of staple fibers having a basis weight of about 3.5 g/m$^2$ or greater wherein the staple fibers comprise a material selected from the group consisting of cotton, polypropylene, blends of polypropylene and polybutene and blends of polypropylene and linear low density polyethylene. In addition, methods of making these multi-layer nonwoven web composites are provided which comprise, bonding to at least one layer of a uniform basis weight self-bonded, fibrous web comprising a plurality of substantially randomly disposed, substantially continuous thermoplastic filaments wherein the web has a BWUI of $1.0\pm0.05$ determined from average basis weights having standard deviations of less than 10%, at least one layer of a carded web of thermoplastic staple fibers. The methods of bonding the self-bonded, fibrous web layers and carded web layers together can be by calendering or by hydroentangling with high pressure liquid columnar streams jetted toward a surface of the composite.

BRIEF DESCRIPTION OF THE DRAWINGS

FIG. 2 is a side view of the system of FIG. 1.

DETAILED DESCRIPTION OF THE INVENTION

Figure 1:
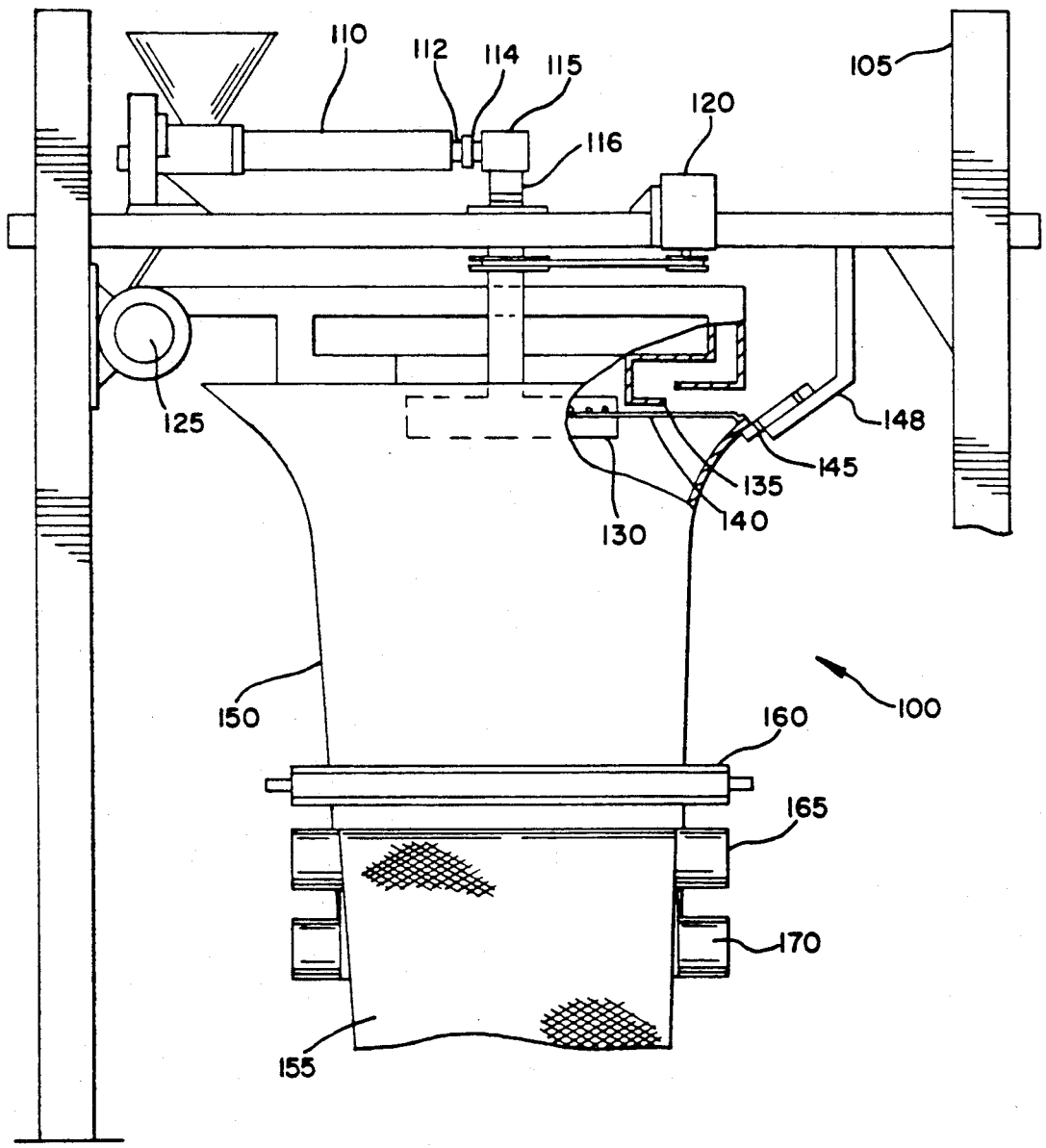
FIG. 1 is a schematic illustration of the system used to produce the self-bonded, fibrous, nonwoven web used in at least one layer of the multi-layer nonwoven web composite of the present invention.

In greater detail, the multi-layer polymeric nonwoven web composite of the present invention comprises at least one layer of a uniform basis weight, self-bonded, fibrous, nonwoven web of substantially randomly disposed, substantially continuous polymeric filaments wherein said web has a Basis Weight Uniformity Index of $1.0\pm0.05$ determined from average basis weights having standard deviations of less than 10%, adhered to at least one layer of a carded nonwoven web of staple fibers.

By "nonwoven web" it is meant a web of material which has been formed without the use of weaving processes and which has a construction of individual fibers, filaments or threads which are substantially randomly disposed.

By "uniform basis weight nonwoven web" it is meant a nonwoven web comprising a plurality of substantially randomly disposed, substantially continuous polymeric filaments having a Basis Weight Uniformity Index of $1.0\pm0.05$ determined from average basis weights having standard deviations of less than 10%. BWUI is defined as a ratio of an average unit area basis weight determined on a unit area sample of web to an average basis weight determined on an area of web, N times as large as the unit area, wherein N is about 12 to about 18, the unit area is 6.4516 cm² (1 in²) and the standard deviations of the average unit area basis weight and of the average basis weight of the area N times as large as the unit area are each less than 10% and the number of samples is sufficient to obtain basis weights at a 0.95 confidence interval. As used herein, in the determination of BWUI, both the average unit area basis weight and the average basis weight of the area N times as large as the unit area must have standard deviations of less than 10% where "average" and "standard deviation" have the definitions generally ascribed to them by the science of statistics. Nonwoven webs having BWUI's of 1.0±0.05 determined from average basis weights having standard deviations greater than 10% for one or both of the averages do not represent a uniform basis weight nonwoven web as defined herein and are poorly suited for use in making the invented composites because the nonuniformity of basis weights may require heavier basis weight materials to be used to obtain the desired coverage and fabric aesthetics. Unit area samples below about 6.4516 cm² (1 in²) in area for webs which have particularly nonuniform basis weight and coverage would represent areas too small to give a meaningful interpretation of the unit area basis weight of the web. The samples on which the basis weights are determined can be any convenient shape, such as square, circular, diamond and the like, with the samples cut randomly from the fabric by punch dies, scissors and the like to assure uniformity of the sample area size. The larger area is about 12 to about 18 times the area of the unit area. The larger area is required to obtain an average basis weight for the web which will tend to "average out" the thick and thin areas of the web. The BWUI is then calculated by determining the ratio of the average unit area basis weight to the average larger area basis weight. For example, for a nonwoven web in which 60 samples of (1 in²) 6.4516 cm² squares determined to have an average basis weight of 0.993667 oz/yd² and a standard deviation (SD) of 0.0671443 (SD of 6.76% of the average) and 60 samples of 16 in² (41.62 cm²) squares (N was 16) determined to have an average basis weight of 0.968667 oz/yd² and a standard deviation of 0.0493849 (SD of 5.10% of the average), the calculated BWUI was 1.026. A BWUI of 1.0 indicates a web with a very uniform basis weight. Materials having BWUI values of less than 0.95 or more than 1.05 are not considered to have uniform basis weights as defined herein. Preferably, the uniform basis weight self-bonded nonwoven web has a BWUI of 1.0±0.03 and a basis weight of about 3.5 g/m² or greater.

By "self-bonded" it is meant that the crystalline and oriented filaments or fibers in the nonwoven web adhere to each other at their contact points thereby forming a self-bonded, fibrous, nonwoven web. Adhesion of the fibers may be due to fusion of the hot fibers as they contact each other, to entanglement of the fibers with each other or to a combination of fusion and entanglement. Of course, bonding does not occur at all contact points. Generally, however, the bonding of the fibers is such that the nonwoven web, after being laid down and before further treatment, has sufficient machine direction (MD) and cross-machine direction (CD) tensile strength to allow handling of the web without additional treatment. No foreign material need be present to promote bonding, and essentially no polymer flows to the intersection points as distinguished from that which occurs during the process of heat-bonding thermoplastic filaments. The bonds are weaker than the filaments as evidenced by the observation that an exertion of a force tending to disrupt the web, as in tufting, will fracture bonds before breaking filaments. Prebonding of the self-bonded nonwoven web is not necessary due to the integrity of the self-bonded web as produced, but of course, the self-bonded web can be prebonded before being used, if desired, e.g., by a calendering operation, adhesives or other prebonding-type processes.

By "substantially continuous" in reference to polymeric filaments of the self-bonded webs, it is meant that a majority of the filaments or fibers formed are substantially continuous nonbroken fibers as they are drawn and formed into the self-bonded nonwoven web.

The carded nonwoven webs comprise staple fibers made from a material selected from the group consisting of cotton and thermoplastics such as rayon, polyesters, polyolefins such as polypropylene, blends of polyolefins such as polypropylene and polybutene and polypropylene and linear low density polyethylene having a length between about 1.9 and 15 cm. The denier of these fibers is in the range of about 1 to about 8 and the crimps per inch for polyolefins and polyesters is about 4 to about 30, and for staple fiber of rayon the crimps per inch is about 8 to about 14. The staple fibers are supplied to a carding line in the form of bales or bundles which are opened mechanically by pickers equipped with sharp teeth or needles to tear the tightly compacted fibers apart by a process called picking. The fibers are transferred mechanically on belts or by chutes to form fiber batts, called picker laps, which are processed by carding.

The carding process can be a revolving flat, stationary flat or workerstripper process. For example, in the revolving flat carding process, a carding machine utilizes opposed moving beds of closely spaced needles to pull and tease the fibers apart. At the center of the carding machine is a large, rotating cylinder covered with a card clothing comprised of needles, wires, or fine metallic teeth embedded in a heavy cloth or metal foundation. Opposing moving beds of needles are wrapped on the large cylinder and a large number of narrow flats are held on an endless belt moving over the top of the cylinder. The needles of the two opposing surfaces are inclined in opposite directions and move at different speeds with the main cylinder moving faster than the flats.

The clumps of fibers between the two beds of needles are separated into individual fibers which are aligned in the machine direction as each fiber is theoretically held by individual needles from the two beds. The fibers engage each other randomly and form a coherent web at and below the surfaces of the needles. The carding machine may also include means to carry the picker lap or batt onto the cylinder where the carding takes place. Other mechanical means remove or doff the web from the cylinder. The doffed web is deposited onto a moving belt where it can be combined with other webs. Carded webs can be up to 3.5 m wide or wider and can be produced at speeds up to 140 m/min or faster. Nonwoven webs made from webs from conventional cards have high machine direction and low cross-machine direction tensile strengths. The problem of low cross-machine tensile strength can be solved by cross-laying an oriented web at or near a 45° angle to another oriented web on the moving belt. However, this procedure is generally not successful with low basis weight carded webs because of the difficulty of accurately laying down the layers without unsightly edge lines.

The uniform basis weight, self-bonded, fibrous, nonwoven web of substantially randomly disposed, substantially continuous polymeric filaments used in the multilayer nonwoven web composites of the present invention can be formed by the apparatus disclosed in U.S. Pat. No. 4,790,736, incorporated herein by reference. In a preferred embodiment, the self-bonded webs are prepared by:

(a) extruding a molten polymer through multiple orifices located in a rotating die;
(b) contacting said extruded polymer while hot as it exits said orifices with a fluid stream to form substantially continuous filaments and to draw said filaments into fibers having deniers in the range of about 0.5 to about 20; and
(c) collecting said drawn fibers on a collection device whereby the filaments extruded through the die strike the collection device and self-bond to each other to form the nonwoven web.

A source of a fiber-forming material such as a thermoplastic melt is provided and conveyed, by a means such as an extruder or a melt pump, into a rotating die having a plurality of spinnerets about its periphery. The rotating die is rotated at an adjustable speed such that the periphery of the die has a spinning speed of about 150 to about 2000 m/min. The spinning speed is calculated by multiplying the periphery circumference by the rotating die rotation speed measured in revolutions per minute (rpm).

The thermoplastic melt is extruded through a plurality of spinnerets located about the circumference of the rotating die. There can be multiple spinning orifices per spinneret and the diameter of an individual spinning orifice can be between about 0.1 to about 2.5 mm, preferably about 0.2 to about 1.0 mm. The length-to-diameter ratio of the spinneret orifice is about 1:1 to about 10:1. The particular geometrical configuration of the spinneret orifice can be circular, elliptical, trilobal or any other suitable configuration. Preferably, the configuration of the spinneret orifice is circular or trilobal. The rate of polymer extruded through the spinneret orifices can be about 0.0225 kg/hr/orifice or greater. Preferably, the rate is about 0.1 kg/hr/orifice or greater.

As the fibers extrude horizontally through spinneret orifices in the circumference of the rotating die, the fibers assume a helical orbit as they begin to fall below the rotating die. The fluid stream which contacts the fibers can be directed downward onto the fibers, can be directed to surround the fibers or can be directed essentially parallel to the extruded fibers. The fluid stream is typically ambient air which can also be conditioned by heating, cooling, humidifying, dehumidifying and the like. A pressure air blower fan can be used to generate a quench air stream. Polymer fibers extruded through the spinneret orifices of the rotary die are contacted by the quench air stream.

The quench air stream can be directed radially above the fibers which are drawn toward the high velocity air stream as a result of a partial vacuum created in the area of the fiber by the air stream. The polymer fibers then enter the high velocity air stream and are drawn, quenched and transported to a collection surface. The high velocity air, accelerated and distributed in a radial manner, contributes to the attenuation or drawing of the radially extruded thermoplastic melt fibers. The accelerated air velocities contribute to the placement or "laydown" of fibers onto a collection surface such as a circular fiber collector surface or collector plate such that uniform basis weight selfbonded, fibrous nonwoven webs are formed that exhibit improved properties, including increased tensile strength and more balanced physical properties in the machine direction and cross-machine direction from filaments having deniers ranging from about 0.5 to about 20 as well as webs which have a very uniform basis weight with BWUI's of 1.0±0.05 determined from average basis weights having standard deviations less than 10%. Preferably, the filament deniers are in the range of about 0.5 to about 20, which for polypropylene corresponds to filament diameters of about 5 to about 220 microns.

The fibers are conveyed to the collector by air at speeds which promote entanglement of the fibers for web integrity. The fibers move at a speed dependent upon the speed of rotation of the die as they are drawn down, and by the time the fibers reach the outer diameter of the orbit, they are not moving circumferentially, but are merely being laid down in that particular orbit basically one on top of another. The particular orbit may change depending upon variation of rotational speed of the die, polymer extrudate rate, polymer extrudate temperature, and the like. External forces such as electrostatic charge or air pressure can be used to alter the orbit and, therefore, deflect the fibers into different patterns.

The uniform basis weight self-bonded, fibrous nonwoven webs are produced by allowing the extruded thermoplastic fibers to contact each other as the fibers are deposited on a collection surface. Many of the fibers, but not all, adhere to each other at their contact points thereby forming the self-bonded, fibrous nonwoven web. Adhesion of the fibers may be due to fusion of the hot fibers as they contact each other, to entanglement of the fibers with each other or to a combination of fusion and entanglement. Generally, the adhesion of the fibers is such that the nonwoven web, after being laid down but before further treatment, has sufficient MD and CD strengths to allow handling of the web without additional treatment such as that generally required by spunbonded nonwoven webs.

The self-bonded, nonwoven web conforms to the shape of the collection surface which can be of various shapes such as a cone-shaped inverted bucket, a moving screen or a flat surface in the shape of an annular strike plate located slightly below the elevation of the die and with the inner diameter of the annular strike plate at an adjustable, lower elevation than the outer diameter of the strike plate.

When an annular strike plate is used as the collection surface, fibers are bonded together during contact with each other and with the annular strike plate and a nonwoven fabric is produced which is drawn back through the aperture of the annular strike plate as a tubular fabric. A stationary spreader can be supported below the rotary die to spread the fabric into a flat, two-ply fabric which is collected by a take-up means such as a pull roll and winder, and the like. In the alternative, a knife-splitter arrangement can be used to cut and split the tubular, two-ply fabric into a single-ply fabric which can be collected by a take-up means such as a pull roll and winder.

The temperature of the thermoplastic melt can affect the process stability for the particular thermoplastic used. The temperature must be sufficiently high so as to enable drawdown, but not so high that thermal degradation of the thermoplastic results.

Process parameters which can influence fiber formation from the thermoplastic polymers include: the spinneret orifice design, dimension and number; the extrusion rate of polymer through the orifices; the quench air velocity; and the rotational speed of the die. The filament diameter can be influenced by all of the above parameters with diameter typically increasing with larger diameter spinneret orifices, higher extrusion rates per orifice, lower quench air velocity and lower rotary die rotation with other parameters remaining constant. Self-bonded nonwoven web productivity can be influenced by the dimension and number of spinneret orifices, the extrusion rate of the polymer melt and, for a given denier fiber, the rotary die rotation, and the like.

In general, any suitable thermoplastic resin can be used in making the self-bonded, fibrous nonwoven webs and carded webs used to make the multi-layer nonwoven web composites of the present invention. Suitable thermoplastic resins include polyolefins of branched and straight-chained olefins such as low density polyethylene, linear low density polyethylene, high density polyethylene, polypropylene, polybutene, polyamides, polyesters such as polyethylene terephthalate, combinations thereof and the like.

The term "polyolefins" is meant to include homopolymers, copolymers and blends of polymers prepared from at least 50 wt % of an unsaturated hydrocarbon monomer. Examples of such polyolefins include polyethylene, polystyrene, polyvinyl chloride, polyvinyl acetate, polyvinylidene chloride, polyacrylic acid, polymethacrylic acid, polymethyl methacrylate, polyethyl acrylate, polyacrylamide, polyacrylonitrile, polypropylene, polybutene-1, polybutene-2, polypentene-1, polypentene-2, poly-3-methylpentene-1, poly-4-methylpentene-1, polyisoprene, polychloroprene and the like. Mixtures or blends of these thermoplastic resins and, optionally, thermoplastic elastomers such as polyurethanes and the like, elastomeric polymers such as copolymers of an isoolefin and a conjugated polyolefin, and copolymers of isobutylenes and the like can also be used.

Preferred thermoplastic resins include polyolefins such as polypropylene, high density polyethylene, low density polyethylene, linear low density polyethylene, blends of polyolefins such as polypropylene and polybutene, and polypropylene and linear low density polyethylene, polyamides and polyesters. The polypropylene (PP) used by itself or in blends with polybutene (PB) and/or linear low density polyethylene (LLDPE) preferably has a melt flow rate in the range of about 10 to about 80 g/10 min as measured by ASTM D-1238. Blends of polypropylene and polybutene and/or linear low density polyethylene provide self-bonded nonwoven webs with softer hand such that the web has greater flexibility and/or less stiffness.

Additives such as colorants, pigments, dyes, opacifiers such as TiO$_2$, UV stabilizers, fire retardant compositions, processing stabilizers and the like can be incorporated into the polypropylene, thermoplastic resins and blends.

Blends of polypropylene and PB can be formulated by metering PB in liquid form into a compounding extruder by any suitable metering device by which the amount of PB being metered into the extruder can be controlled. PB can be obtained in various molecular weight grades with higher molecular weight grades typically requiring heating to reduce the viscosity for ease of transferring the PB. A stabilizer additive package can be added to the blend of polypropylene and PB if desired. Polybutenes suitable for use can have a number average molecular weight measured by vapor phase osmometry of about 300 to about 3000. The PB can be prepared by well-known techniques such as the Friedel-Crafts polymerization of feedstocks comprising isobutylene, or they can be purchased from a number of commercial suppliers such as Amoco Chemical Company, Chicago, Ill., which markets polybutene under the tradename Indopol ®. A preferred number average molecular weight for PB is in the range of about 300 to about 2500.

The PB can be added directly to PP or it can be added via a masterbatch prepared by adding PB to PP at weight ratios of 0.2 to 0.3 based on PP in a mixing device such as a compounding extruder with the resulting masterbatch blended with polypropylene in an amount to achieve a desired level of PB. For making the self-bonded webs used in making the composites in the instant invention, the weight ratio of PB typically added to polypropylene can range from about 0.01 to about 0.15. When a weight ratio of PB below about 0.01 is added to PP, very little benefit such as better hand and improved softness is obtained from the blends, and when PB is added at a weight ratio above about 0.15, minute amounts of PB can migrate to the surface which may detract from the fabric appearance. Blends of polypropylene and PB can have a weight ratio of PP in the range of about 0.99 to about 0.85, preferably about 0.99 to about 0.9, and a weight ratio of PB in the range of about 0.01 to about 0.15, preferably about 0.01 to about 0.10.

Blends of polypropylene and LLDPE can be formulated by blending PP resin in the form of pellets or powder with LLDPE in a mixing device such as a drum tumbler and the like. The resin blend of PP and LLDPE with an optional stabilizer additive package can be introduced to a polymer melt mixing device such as a compounding extruder of the type typically used to produce polypropylene product in a polypropylene production plant and compounded at temperatures between about 149° and about 260° C. Although blends of PP and LLDPE can range from a weight ratio of nearly 1.0 for PP to a weight ratio of nearly 1.0 for LLDPE, typically, the blends of PP and LLDPE useful for making self-bonded webs used in the self-bonded nonwoven web and carded web composites of the present invention can have a weight ratio of PP in the range of about 0.99 to about 0.85, preferably in the range of about 0.98 to about 0.92, and a weight ratio of LLDPE in the range of about 0.01 to about 0.15, preferably in the range of about 0.02 to about 0.08. For weight ratios less than 0.01 the property of a softer hand imparted from the LLDPE is not obtained, and for weight ratios above 0.15 less desirable physical properties and a smaller processing window are obtained.

The LLDPE can be random copolymers of ethylene with 1 to 15 wt % of higher olefin co-monomers, such as propylene, n-butene-1, n-hexene-1, n-octene-1 or 4-methylpentene-1, produced over transition metal coordination catalysts. Such linear low density polyethylenes can be produced in liquid phase or vapor phase processes. The preferred density of the LLDPE is in the range of about 0.91 to about 0.94 g/cc.

The uniform basis weight self-bonded, fibrous nonwoven web used for at least one layer of the multi-layer nonwoven web composite of the present invention can be produced by a system 100, schematically shown in FIG. 1. System 100 includes an extruder 110 which extrudes a fiber-forming material such as a thermoplastic polymer melt through feed conduit and adapter 112 to a rotary union 115. A positive displacement melt pump 114 may be located in the feed conduit 112 if the pumping action provided by extruder 110 is not sufficiently accurate for the desired operating conditions. An electrical control can be provided for selecting the rate of extrusion and displacement of the extrudate through the feed conduit 112. Rotary drive shaft 116 is driven by motor 120 at a speed selected by a control means (not shown), and is coupled to rotary die 130. Radial air aspirator 135 is located around rotary die 130 and is connected to air blower 125. Air blower 125, air aspirator 135, rotary die 130, motor 120 and extruder 110 are supported on or attached to frame 105.

In operation, fibers are extruded through and thrown from the rotary die 130 by centrifugal action into a high velocity air stream provided by aspirator 135. The air drag created by the high velocity air causes the fibers to be drawn down from the rotary die 130 and also to be stretched or attuenuated. A web-forming plate 145 in the shape of an annular ring surrounds the rotary die 130. As rotary die 130 is rotated and fibers 140 extruded, the fibers 140 strike the web-forming plate 145. Web-forming plate 145 is attached to frame 105 with support arm 148. Fibers 140 are self-bonded during contact with each other and plate 145, thus forming a tubular nonwoven web 150. The tubular nonwoven web 150 is then drawn through the annulus of web-forming plate 145 by pull rolls 170 and 165, through nip rolls 160 supported below rotary die 130 which spreads the fabric into a flat two-ply composite 155 which is collected by pull rolls 165 and 170 and may be stored on a roll (not shown) in a standard fashion.

FIG. 2 is a side view of system 100 of FIG. 1 schematically showing fibers 140 being extruded from rotary die 130, attenuated by the high velocity air from aspirator 135, contacting of fibers 140 on web-forming plate 145 to form tubular nonwoven web 150. Tubular nonwoven web 150 is drawn through nip rolls 160 by pull rolls 170 and 165 to form flat two-ply composite 155.

The multi/layer nonwoven web composites of the present invention can be produced by adhering at least one layer of a uniform basis weight self-bonded, fibrous nonwoven web having a plurality of substantially randomly disposed, substantially continuous filaments and a BWUI of $1.0 \pm 0.05$ determined from average basis weights having standard deviations less than 10% to at least one layer of a carded web. Preferably the BWUI of the self-bonded nonwoven web is $1.0 \pm 0.03$ and the nonwoven web and the carded web have basis weights of about 3.5 g/m$^2$ or greater. Processes for adhering the layers of the multi-layer composites of the present invention can be any of the bonding techniques of thermal, chemical/adhesion, ultrasonic, hydroentangling and needling. Needling is typically used for bonding of composites having basis weights of 100 g/m$^2$ or greater. Thermal and chemical/adhesive bonding can be either point- or area-bonding with the choice of bonding dependent upon the ultimate application for the composite.

By "hydroentangling" is meant that a plurality of high pressure columnar streams of liquid are jetted toward a surface of the composite of the present invention thereby entangling and intertwining filaments of one or more layers of the uniform basis weight self-bonded fibrous nonwoven web with one or more layers of the carded web to provide the multi-layer nonwoven web composite. When a composite of uniform basis weight self-bonded, fibrous nonwoven webs and carded webs is hydroentangled, the composite remains basically two-sided, but a sufficient amount of the fibers from the carded web loop around some of the filaments from the self-bonded web to bond together the entire composite structure. While a small amount of entanglement also occurs between filaments of the self-bonded web most of the bonding is due to segments of the staple fibers of the carded web entangling around and within the filaments of the self-bonded web.

Composites of uniform basis weight self-bonded nonwoven webs and carded webs subjected to hydroentangling can be completely nonwoven such that these composites do not contain a woven or knitted constituent. Other nonwoven layers such as nets, scrims, foams or polymeric coatings can also be laminated to hydroentangled multi-layer nonwoven web composites of the present invention. These composites can also undergo additional bonding by chemical or thermal means if properties such as added strength are desired.

Hydroentangling, also referred to as hydraulically entanglement, involves treatment of the layers of the composite with the composite on a support which contains apertures through which streams of liquid, such as water, issue from jet devices. The support can be a mesh screen, forming wires or a support with a pattern such that a nonwoven material can be formed having that pattern. Fiber entanglement is accomplished by jetting liquid supplied at pressures from about 700 to about 20,000 kPa to form fine, essentially columnar, liquid streams toward the surface of the supported fiber-containing material. The supported composite is traversed with the streams until the fibers are randomly entangled and interconnected. The composite can be passed through the hydraulic entangling apparatus one or more times on one or both sides. The jet orifices which produce the columnar liquid streams can have typical diameters known in the art, for example, 1.25 mm, and can be arranged in one or more rows with multiple orifices. Various techniques of hydraulic entanglement are disclosed in U.S. Pat. No. 4,950,351 and the references described therein.

After the composite has been hydroentangled, it can be dried by a thru air drier or other means and then wound unto a take-up roll. Optionally, after hydroentanglement, the composite can be further treated, such as by thermal bonding, coating, and the like.

In the process of thermal point-bonding, a heated calender is used comprising heated rolls between which are passed the individual layers of the composite to be bonded. The calender rolls can be made from steel, steel wool and the like and can have working widths up to 3 m or greater and diameters related to the working width of the calender for required stiffness and strength of the rolls. The calender rolls can be oriented such that the composites can be formed by passing between the calender rolls in either an horizontal or a vertical direction. One or both rolls can contain embossing patterns for point-bonding and can be heated by electrical heating or oil heating.

The bonding pattern of the embossing rolls can have a regular or intermittent pattern. Typically, an intermittent pattern is used with the area of composite surface occupied by bonds ranging from about 5 to 50 percent of the surface area, preferably about 10 to about 25 percent of the surface area. The bonding can be done as point-bonding or stripe-bonding with the intent of the bonding being to keep the layers of the composites from delaminating while at the same time not forming an overly stiff composite. For the present invention thermal point-bonding calendering and hydroentangling are the preferred bonding processes.

Depending on factors such as the thermoplastic used for the various composite layers, the desired composite production rate, the composite basis weight, and the embossing pattern design, calender process parameters such as the temperature of the embossing rolls, the pressure exerted on the composite by the rolls and the speed of the nonwoven webs fed to the calender can be varied to achieve the desired results. The temperature of the calender rolls can range from about 105° to about 235° C., the pressure exerted on the composite by the rollers can range from about 10 to about 1000 pounds per linear inch (pli) and the speed of the nonwoven webs fed to the calender can range from about 0.05 to about 7.5 m/s.

If the calender roll temperatures are too low for the particular multi-layer composite being formed, the layers of the resulting composite will tend to delaminate because insufficient bonding of the layers has occured; however, if the calender roll temperatures are too high, the layers of nonwoven webs will fuse and form a film and thereby negate the air permeability properties of the composite and possibly produce composites with less desirable tensile properties.

A method of making the multi-layer nonwoven web composites of the present invention comprises the steps of:

bonding to at least one layer of a uniform basis weight, self-bonded, fibrous, nonwoven web comprising a plurality of substantially randomly disposed, substantially continuous thermoplastic filaments wherein said web has a Basis Weight Uniformity Index of 1.0±0.05 determined from average basis weights having standard deviations less than 10%.

at least one layer of a carded web of thermoplastic staple fibers.

In one preferred embodiment, the method comprises self-bonded, fibrous, nonwoven web and carded web with both webs comprising a polypropylene having a melt flow rate in the range of about 10 to about 80 g/10 min as measured by ASTM D-1238 and the bonding comprises providing the self-bonded, fibrous, nonwoven web and the carded web to a calender at a speed of about 0.05 to about 7.5 m/s wherein the calender has an embossing roll maintained at a temperature in the range of about 105° to about 235° C. and a smooth roll maintained at a temperature in the range of about 105° to about 235° C. and a pressure maintained between the embossing roll and the smooth roll of about 10 to about 1000 pli. If desired, a secondary calendering operation employing smooth rolls can also be used. In another preferred embodiment of the method, the bonding comprises hydroentangling the self-bonded, fibrous nonwoven web to the carded web.

In one embodiment, the multi-layer nonwoven web composite of the present invention having improved cross-machine direction tensile strength per unit basis weight, improved rewet properties and a basis weight of about 7 g/m² or greater comprises, at least one layer of a uniform basis weight self-bonded, fibrous nonwoven web comprising a plurality of substantially randomly disposed, substantially continuous thermoplastic filaments wherein the filaments have deniers in the range of about 0.5 to about 20, the self-bonded, fibrous nonwoven web has a basis weight of about 3.5 g/m² or greater and a Basis Weight Uniformity Index of 1.0±0.05 determined from average basis weights having standard deviations of less than 10%, bonded to at least one layer of a carded web of thermoplastic staple fibers having a basis weight of about 3.5 g/m² or greater. Preferably, the thermoplastic filaments of the self-bonded, fibrous nonwoven web comprise a thermoplastic selected from the group consisting of polypropylene, high-density polyethylene, low density polyethylene, linear low density polyethylene, blends of polypropylene and polybutene and blends of polypropylene and linear low density polyethylene and the staple fiber of the carded web comprises a thermoplastic selected from the group consisting of polypropylene, blends of polypropylene and polybutene and blends of polypropylene and linear low density polyethylene.

In another embodiment, the multi-layer nonwoven composite of this invention having a basis weight in the range of about 7 to about 100 g/m² comprises one layer of the self-bonded, fibrous, nonwoven web and one layer of the carded web wherein the thermoplastic filaments of the self-bonded, fibrous, nonwoven web comprise polypropylene. This two-layer composite has particularly advantageous applications as diaper and hygienic product coverstock. Such a composite can be produced by thermal point-bonding at least one layer of the uniform basis weight self-bonded, fibrous, nonwoven web to at least one layer of the carded web.

The self-bonded nonwoven web can be supplied directly from the process described above or from product wound on a roll. The self-bonded nonwoven web can be either a single-ply or a multi-ply nonwoven web. For example, a two-ply web having a nominal basis weight of 17 g/m² comprises two plies of a self-bonded web each having a nominal basis weight of 8.5 g/m². The two-ply self-bonded web enhances the excellent uniform basis weight of the single plies that make up the two-ply webs. Although the self-bonded nonwoven web can have post-treatment, such as thermal bonding, one embodiment of producing a two-layer nonwoven web composite of the present invention uses no post-treatment before the composite is formed. The self-bonded web is preferably prepared from a thermoplastic selected from the group consisting of polypropylene, blends of polypropylene and polybutene, and blends of polypropylene and linear low density polyethylene and has a basis weight of about 3.5 to 50 g/m².

A layer of self-bonded nonwoven web is supplied from the roll to a calender which has a smooth steel roll and a steel point-embossed roll. The temperature, pressure and embossing patterns on the embossing roll and speed of the nonwoven webs fed to the calender depend on the thermoplastic material used to produce the self-bonded web and the carded web as well as the type of composite desired in terms of stiffness, strength and other properties.

Before the self-bonded web is fed to the calender rolls, a carded web from a carded fiber line or a take-up roll is layered onto the self-bonded web before passing between the calender rolls. The staple fibers of the carded web are preferably made from a thermoplastic selected from the group consisting of polypropylene, blends of polypropylene and polybutene, and blends of polypropylene and linear low density polyethylene and the carde web has a basis weight of about 3.5 to about 50 g/m². For calendering the staple fiber length can be up to 15 cm and for hydroentangling the staple fiber length for polypropylene carded web should be less than about 4 cm.

For composites produced from self-bonded webs and carded webs made of polypropylene the embossing roll can be contact with the carded web layer and can have a temperature in the range of about 110° to about 205° C. and the smooth roll can be in contact with the self-bonded web and can have a temperature in the range of about 105° to about 175° C. The pressure between the embossing roll and the smooth roll is maintained at about 10 to about 1000 pli and the multi-layer composites are produced at speeds of about 0.05 to about 7.5 m/s.

To obtain a composite with the desired properties of improved cross-machine direction tensile strength per unit of composite basis weight and improved rewet properties, a carded web with the desired softness and wicking properties is selected. In order to provide a fabric of sufficient strength, durability and improved cross-machine direction tensile strength per unit of composite basis weight the composites of the present invention are provided with self-bonded webs bonded to the carded web to provide strength and protection of the carded web. The self-bonded web comprising a plurality of substantially randomly disposed, substantially continuous thermoplastic filaments used as the protective layer has a very uniform basis weight and is bonded to the carded web. The uniform basis weight of the self-bonded web allows lower basis weight self-bonded nonwoven webs to be used for the layers providing strength and durability, and benefits the consumer with a lighter weight and more economical product having improved cross-machine direction tensile strength per unit of basis weight and improved rewet properties.

Among the advantages obtained from the multi-layer nonwoven web composites of the present invention is a two-layer composite particularly useful as an inner, liquid permeable liner referred to herein by the term coverstock for disposable diapers and the like. This inner liner which lies closest to the wearer's skin can be a two-layer composite comprising a self-bonded web bonded to a carded web combining the strength, durability and uniform basis weight of the self-bonded web with the softness and moisture carrying and wicking properties of the carded web.

Another advantage is the use of self-bonded nonwoven web from rolls with the carded web to produce the desired basis weight and physical property composite web. This enables composites to be produced in which outer layers of the self-bonded nonwoven web can have different basis weigths, different pigments or different fabric treatments added to the self-bonded webs before producing the desired multi-layer nonwoven web composites of self-bonded and carded webs.

The basis weight of the self-bonded nonwoven web can have a weight ratio of about 0.2 to about 0.8 of the total basis weight of the multi-layer nonwoven web composite, preferably a weight ratio of about 0.4 to about 0.6.

Other multi-layer nonwoven web composites can be formed, including three-layer composites having an intermediate layer of a self-bonded web with a carded web layer on either side of the self-bonded web, or the three-layer composite can have a carded web as an intermediate layer with a layer of a self-bonded web on either side of the carded web or the layers of the self-bonded web can be on the same side. The layers of self-bonded webs can be single-ply or multiple-ply, especially two-ply. Multiple layers of self-bonded webs can be combined with each self-bonded web having a particular desired basis weight, color additive and/or fabric treatment. Applications for the multi-layer nonwoven webs of the present invention include diaper and hygienic product coverstock, protective laminates for apparel, protective laminates for machinery and automobiles and wipes. Included in these applications is a composite which combines the oil absorption properties of a cotton carded web with the strength and buoyancy properties of a polypropylene self-bonded web to form continuous belts for use in oil absorption applications.

Descriptions of the test procedures used to determine properties reported for preparation of various self-bonded nonwoven webs and examples appearing below are as follows:

Tensile and Elongation—Test specimens are used to determine tensile strength and elongation according to ASTM Test Method D-1682. Stripe tensile strength can be measured in the machine direction on 2.54 cm wide samples of the fabric or in the cross-machine direction and is reported in units of lbs or grams. A high value is desired for tensile strength.

Elongation can also be measured in the MD or in the CD and is reported in units of %. Lower values are desired for elongation.

Trapezoidal Tear Strength—The trapezoidal tear strength (Trap Tear) is determined by ASTM Test Method D-1117 and can be measured in the MD or in the CD and is reported in units of grams (lbs) with a high value desired.

Fiber Denier—The fiber diameter is determined by comparing a fiber specimen sample to a calibrated reticle under a microscope with suitable magnification. From known polymer densities, the fiber denier is calculated.

Basis Weight—The basis weight for a test sample is determined by ASTM Test Method D-3776 Option C.

Basis Weight Uniformity Index—The Basis Weight Uniformity Index (BWUI) is determined for a nonwoven web by cutting a number of unit area and larger area samples from the nonwoven web. The method of cutting can range from the use of scissors to stamping out unit areas of material with a die which will produce a consistently uniform unit area sample of nonwoven web. The shape of the unit area sample can be square, circular, diamond or any other convenient shape. The unit area is 6.4516 cm² (1 in²) and the number of samples is sufficient to give a 0.95 confidence interval for the basis weight of the samples. Typically, the number of samples can range from about 40 to 80. From the same nonwoven web an equivalent number of larger area samples are cut and weighed. The larger samples are obtained with appropriate equipment with the samples having areas which are N times larger than the unit area samples, where N is about 12 to about 18. The average basis weight is calculated for both the unit area sample and the larger area sample with the BWUI ratio determined from the average basis weight of the unit area divided by the average basis weight of the larger area.

Runoff—Runoff is a measure of the ability of a material to allow a fluid to pass through the material and be absorbed. The numerical determination of runoff is expressed as a percent of the fluid captured of the amount of fluid initially used. A weighed absorbent pad of filter paper and a nonwoven fabric to be tested both having a length of at least 260 mm and a width of at least 140 mm are clamped on a smooth impermeable runoff board which is placed at an angle of 45° to the perpendicular. The filter paper and test samples are conditioned at 23°±1° C. and 50±2% relative humidity for at least 24 hours before testing. At the upper end of the absorbent pad of filter paper, a discharge nozzle which is connected to a pump calibrated to release 25 ml of a test solution in 3.75 seconds is mounted. The test solution can be a synthtic urine solution or distilled water. Dry paper towels, folded several times to make a strip approximately 260 mm long and 12 mm wide, are weighed and positioned approximately 10 mm from the edge of the runoff board. The test fluid is pumped onto the sample and any test fluid that does not pass through the test sample and runs off is caught on the paper towels and any test fluid remaining on the runoff board is also wiped up with the towels. The wet paper towels are reweighed and the weight gain recorded. The % runoff is calculated by dividing the weight gained by 25 and multiplying that result by 100. A low or zero value is desirable.

Strikethrough/Rewet—Strikethrough is the time required for a given amount of test fluid to pass through a nonwoven web into an underlying core and rewet is the tendency of fluid to move back through the nonwoven web after initial wetting. A weighed absorbent pad of filter paper having a square dimension of about 125 mm · 125 mm is placed on a plexiglass plate with a similar sized sample of nonwoven web to be tested placed on top of the filter paper. For a given weight of filter paper, an appropriate amount of test solution is determined. A strikethrough plate is used to measure the time required for 5 ml of a test solution from a buret to flow through the test sample. Strikethrough time is measured by the completion and breaking of an electrical circuit in a strikethrough plate cavity by the present or absence of the test fluid. The tip of the funnel of the buret should be 28.5 mm above the plexiglass plate. The strikethrough time required for the 5 ml of test solution is recorded to the nearest 0.01 sec. A low value is desirable. After the strikethrough time has been determined, the remaining amount of the determined quantity of test solution is released into the strikethrough plate cavity. At completion of the release of the remaining test solution, the assembly and strikethrough plate are removed and a compression weight formed from at least a 3500 g weight on a 10 cm square plexiglass plate and wrapped with a polyethylene covering is lowered onto the test sample over a 5 second span. The weight is maintained in position for 3 minutes and then removed and the polyethylene covering is dried with a paper towel. Weighed and dry filter papers are placed on top of the test sample and the weight is replaced onto the filter paper over a 5 second span and maintained in place for 2 minutes. The weight is removed and the filter paper is quickly reweighed. The surface wetness or rewet is calculated as the wet filter paper weight minus the dry filter paper weight and reported in grams. A low value is desirable.

Preparation of self-bonded nonwoven webs from polypropylene having a BWUI of 1.0075, from blends of polypropylene and polybutene and from blends of polypropylene and linear low density polyethylene are given below.

SELF-BONDED NONWOVEN POLYPROPYLENE WEB PREPARATION

A polypropylene resin, having a nominal melt flow rate of 35 g/10 min, was extruded at a constant extrusion rate into and through a rotary union, passages of the rotating shaft and manifold system of the die and spinnerets to an annular plate as shown in FIG. 1 with process conditions summarized below:

| Extrusion conditions | |
|---|---|
| Temperature, °C. | |
| Zone-1 | 232 |
| Zone-2 | 260 |
| Zone-3 | 305 |
| Adapter | 316 |
| Rotary Union | 219 |
| Die | 219 |
| Extruder Head Pressure, kPa | 1380-2760 |
| Die rotation, rpm | 2500 |
| Extrudate rate, kg/hr/orifice | 0.29 |
| Air quench pressure, mm of $H_2O$ | 1320 |

| Basis Weight Uniformity Index | |
|---|---|
| Thickness, mils | |
| Number of Samples | 60 |
| Average Thickness | 11.04 |
| Standard Deviation | 1.22505 |
| Basis Weight | |
| Number of Samples | 60 |
| Test Specimen Type | 2.54 cm square |
| Weight, g | |
| Average | 0.02122 |
| Standard Deviation, % of average | 6.6 |
| Basis Weight, g/m² | 32.86 |
| Number of Samples | 60 |
| Test Specimen Type | 10.16 cm square |
| Weight, g | |
| Average | 0.3370 |
| Standard Deviation, % of average | 4.8 |
| Basis Weight, g/m² | 32.62 |
| Basis Weight Uniformity Index (BWUI) | 1.0075 |

SELF-BONDED NONWOVEN WEB PREPARATION FROM BLENDS OF POLYPROPYLENE AND POLYBUTENE AND POLYPROPYLENE AND LINEAR LOW DENSITY POLYETHYLENE

A blend (PP/PB) of 93 wt % of a polypropylene having a nominal melt flow rate of 38 g/10 min and 7 wt % of polybutene having a nominal number average molecular weight of 1290 was melt blended in a Werner & Pfleiderer ZSK-57 twin-screw extruder and Luwa gear pump finishing line. A blend (PP/LLDPE) of 95 wt % of a polypropylene having a nominal melt flow rate of 38 g/10 min and 5 wt % of a linear low density polyethylene having a nominal density of 0.94 g/cc was melt blended in a 63.5 mm Davis Standard single-screw extruder. The resulting blends were extruded at constant extrusion rates into and through a rotary union, passages of the rotating shaft and manifold system of the die and spinnerets to an annular plate as in equipment as shown in FIG. 1 and described above. The process conditions were:

| Blend | PP/PB | PP/LLDPE |
|---|---|---|
| Extrusion conditions | | |
| Temperature, °C | | |
| Zone-1 | 224 | 255 |
| Zone-2 | 232 | 282 |
| Zone-3 | 299 | 319 |
| Adapter | 298 | 319 |
| Rotary Union | 288 | 288 |
| Die | 232 | 232 |
| Screw rotation, rpm | 50 | 40 |
| Extruder Head Pressure, kPa | 5515 | 6900 |
| Die rotation, rpm | 2100 | 2100 |
| Extrudate rate, kg/hr/orifice | 0.35 | 0.3 |
| Product physical characteristics | | |
| Filament denier (average) | 3-4 | NM |
| Basis weight, g/m$^2$ | 42.4 | 8.5 |
| Grab tensile MD, kg | 6.1 | NM |
| CD, kg | 4.1 | NM |
| Elongation MD, % | 150 | NM |
| CD, % | 320 | NM |
| Trap tear MD, kg | 1.54 | NM |
| CD, kg | 1.18 | NM |

A nominal 34 g/m$^2$ polypropylene self-bonded nonwoven web was prepared by the method described above and calendered with a hard steel, embossed calender roll and a hard steel, smooth calender roll with both rolls maintained at a temperature of 126.5° C. with an embossing pattern of 256 squares/in$^2$ with the squares angled diagonally such that the squares present a diamond-like appearance in the machine or cross-machine direction with the bonding area being a nominal 16% of the surface area of the composite. A pressure of 2760 kPa was maintained on the web. Filament denier, basis weights for 1 in × 1 in square and 4 in × 4 in square samples, cross machine direction and machine direction tensile strengths were determined for this selfbonded nonwoven web, as well as for nominal 34 g/m$^2$ basis weight spunbonded materials such as Kimberly-Clark's Accord (Comparative A), James River's Celestra (Comparative B) and Wayn-Tex's Elite (Comparative C). These properties are summarized in Tables I-V below.

TABLE I

NONWOVEN WEB PROPERTIES
Basis Weight - 4 in × 4 in Square Samples

| Property | Self-bonded Nonwoven Web | Comparative A | Comparative B | Comparative C |
|---|---|---|---|---|
| Number of Samples | 60 | 60 | 60 | 18 |
| Sample Area, in$^2$ | 16 | 16 | 16 | 16 |
| Basis Weight, oz/yd$^2$ | | | | |
| Average | 0.968667 | 0.998833 | 1.01317 | 0.967778 |
| Median | 0.97 | 1.01 | 1.00 | 0.98 |
| Variance | 2.43887 × 10$^{-3}$ | 7.09523 × 10$^{-3}$ | 6.84234 × 10$^{-3}$ | 1.42418 × 10$^{-2}$ |
| Minimum | 0.86 | 0.8 | 0.82 | 0.78 |
| Maximum | 1.07 | 1.21 | 1.2 | 1.21 |
| Range | 0.21 | 0.41 | 0.38 | 0.43 |
| Standard Deviation (SD) | 0.0493849 | 0.0842332 | 0.0827185 | 0.119339 |
| SD, % of Average | 5.10 | 8.43 | 8.16 | 12.33 |

TABLE II

NONWOVEN WEB PROPERTIES
Basis Weight - 1 in × 1 in Square Samples

| Property | Self-bonded Nonwoven Web | Comparative A | Comparative B | Comparative C |
|---|---|---|---|---|
| Number of Samples | 60 | 60 | 60 | 60 |
| Sample Area, in$^2$ | 1 | 1 | 1 | 1 |
| Basis Weight, oz/yd$^2$ | | | | |
| Average | 0.993667 | 0.9665 | 0.9835 | 0.945167 |
| Median | 0.99 | 0.965 | 0.97 | 0.97 |
| Variance | 4.50836 × 10$^{-3}$ | 0.0186774 | 0.0245214 | 0.0251847 |
| Minimum | 0.88 | 0.69 | 0.69 | 0.62 |
| Maximum | 1.17 | 1.26 | 1.32 | 1.34 |
| Range | 0.29 | 0.57 | 0.63 | 0.72 |
| Standard Deviation (SD) | 0.0671443 | 0.136665 | 0.156593 | 0.158697 |
| SD, % of Average | 6.76 | 14.14 | 15.92 | 16.79 |
| BWUI | 1.026 | 0.968* | 0.971* | 0.977* |

*SD > 10% of average for one or both basis weights

NM — Not Measured

TABLE III

NONWOVEN WEB PROPERTIES
Filament Denier

| Property | Self-bonded Nonwoven Web | Comparative A | Comparative B | Comparative C |
|---|---|---|---|---|
| Number of Samples | 100 | 100 | 100 | 100 |
| Denier | | | | |
| Average | 2.254 | 2.307 | 3.962 | 5.295 |
| Median | 1.7 | 2.2 | 4.2 | 5.8 |
| Variance | 1.22473 | 0.206718 | 0.326622 | 0.82048 |
| Minimum | 0.9 | 1.2 | 2.8 | 2.2 |
| Maximum | 5.8 | 4.2 | 5.8 | 7.7 |

TABLE III-continued

NONWOVEN WEB PROPERTIES
Filament Denier

| Property | Self-bonded Nonwoven Web | Comparative A | Comparative B | Comparative C |
|---|---|---|---|---|
| Range | 4.9 | 3 | 3 | 5.5 |
| Standard Deviation (SD) | 1.10668 | 0.454663 | 0.571509 | 0.905803 |
| SD, % of Average | 49.10 | 19.71 | 14.42 | 17.11 |

TABLE IV

NONWOVEN WEB PROPERTIES
Cross Machine Direction Tensile Strength

| Property | Self-bonded Nonwoven Web | Comparative A | Comparative B | Comparative C |
|---|---|---|---|---|
| Number of Samples | 30 | 30 | 30 | 18 |
| Tensile Strength, lb | | | | |
| Average | 4.60217 | 9.14053 | 2.94907 | 4.00072 |
| Median | 4.694 | 9.035 | 2.772 | 3.9435 |
| Variance | 0.19254 | 2.09982 | 0.271355 | 1.71677 |
| Minimum | 3.742 | 5.318 | 2.166 | 1.399 |
| Maximum | 5.374 | 11.56 | 4.443 | 6.15 |
| Range | 1.632 | 6.242 | 2.277 | 4.751 |
| Standard Deviation (SD) | 0.438794 | 1.44908 | 0.520918 | 1.31025 |
| SD, % of Average | 9.53 | 15.85 | 17.66 | 32.75 |

TABLE V

NONWOVEN WEB PROPERTIES
Machine Direction Tensile Strength

| Property | Self-bonded Nonwoven Web | Comparative A | Comparative B | Comparative C |
|---|---|---|---|---|
| Number of Samples | 30 | 30 | 30 | 18 |
| Tensile Strength, lb | | | | |
| Average | 4.7511 | 5.51813 | 8.56907 | 6.93222 |
| Median | 4.7675 | 5.4755 | 8.7675 | 6.4725 |
| Variance | 0.0789548 | 0.686962 | 1.22762 | 5.84547 |
| Minimum | 4.15 | 3.71 | 6.489 | 3.436 |
| Maximum | 5.251 | 7.04 | 10.21 | 12.16 |
| Range | 1.101 | 3.33 | 3.721 | 8.724 |
| Standard Deviation (SD) | 0.280989 | 0.828832 | 1.10798 | 2.41774 |
| SD, % of Average | 5.91 | 15.02 | 12.93 | 34.88 |

The following examples further elaborate the present invention, although it will be understood that these examples are for purposes of illustration, and are not intended to limit the scope of the invention.

EXAMPLE 1

A two-layer nonwoven web composite was made using a layer of a uniform basis weight self-bonded, fibrous nonwoven web and a layer of a carded web. The self-bonded nonwoven web was prepared in the form of a two-ply web from a polypropylene having a nominal melt flow rate of 35 g/10 min and had a nominal uniform basis weight of 8.5 g/m² with a BWUI and standard deviation of basis weight similar to the self-bonded web described in Tables I and II and was wound on a roll. The carded web was prepared on a carded fiber line from a polypropylene having a melt flow rate of 31 g/10 min and had a nominal basis weight of 8.5 g/m². The self-bonded web was fed from the roll to a carded web line and thermobonded on an in-line 116.8-cm wide calender with a hard steel, embossed calender roll temperature maintained at 138° C., and a hard steel, smooth calender roll temperature maintained at 135° C. The bonding area of the embossing roll was a nominal 20 percent of the total surface area of the composite. A pressure of 2070 kPa was maintained on the two layers to thermally bond the layers to form a twolayer nonwoven web composite at a speed of 0.5 m/s. The physical properties and Runoff, Strikethrough and Rewet measurements determined for the twolayer nonwoven web composite are given in Table VI below.

TABLE VI

Two-layer Nonwoven Web Composite
Product physical characteristics

| | |
|---|---|
| Basis weight, g/m² | 18.3 |
| Thickness, mm | 0.17 |
| Strip tensile MD, g | 520 |
| CD, g | 510 |
| Elongation MD, % | 40 |
| CD, % | 56 |
| Runoff, % | 11 |
| Strikethrough, sec | 3.57 |
| Rewet, g | 0.046 |

EXAMPLE 2

A two-layer nonwoven web composite was made using a layer of a uniform basis weight self-bonded, fibrous nonwoven web and a layer of a carded web. The self-bonded nonwoven web was prepared in the form of a two-ply web from a polypropylene having a nominal melt flow rate of 35 g/10 min and had a uniform basis weight of 17 g/m² with a BWUI and standard deviation of basis weight similar to the self-bonded web described in Tables I and II and was wound on a roll. The carded web was prepared on a carded fiber line from a polypropylene having a melt flow rate of 31 g/10 min and had a nominal basis weight of 17 g/m². The self-bonded web was fed from the roll to a carded web line and thermobonded on an in-line 116.8-cm wide calender with a hard steel, embossed calender roll temperature maintained at 135° C., and a hard steel, smooth calender roll temperature maintained at 134° C. The bonding area of the embossing upper roll was a nominal 20 percent of the total surface area of the composite. A pressure of 2070 kPa was maintained on the two layers to thermally bond the layers to form a two-layer nonwoven web composite at a speed of 0.5 m/s. The physical properties and Runoff, Strikethrough and Rewet measurements determined for the two-layer nonwoven web composite are given in Table VII below.

TABLE VII

| Two-layer Nonwoven Web Composite Product physical characteristics | |
|---|---|
| Basis weight, g/m² | 35.5 |
| Thickness, mm | 0.32 |
| Strip tensile MD, g | 1060 |
| CD, g | 1300 |
| Elongation MD, % | 61 |
| CD, % | 136 |
| Runoff, % | 100 |
| Strikethrough, sec | 4.32 |
| Rewet, g | 0.21 |

EXAMPLE 3

Three-layer nonwoven web composites were made using uniform basis weight self-bonded, fibrous nonwoven webs for the outer two layers and a carded web for the intermediate layer. The self-bonded nonwoven webs were prepared in the form of two-ply webs from a polypropylene having a nominal melt flow rate of 35 g/10 min and had nominal uniform basis weights of 5.9 and 8.5 g/m² with BWUls and standard deviations of basis weight similar to the self-bonded web described in Tables I and II and the webs wound onto rolls. The carded webs were prepared on a carded fiber line from a polypropylene having a melt flow rate of 31 g/10 min and had nominal basis weights of 11.9 and 17.0 g/m². Self-bonded webs having the same basis weight were fed from two rolls to a carded web line and thermobonded on an in-line 116.8-cm wide calender with a hard steel, embossed calender roll temperature maintained at 135° C., and a hard steel, smooth calender roll temperature maintained at 134° C. The bonding area of the embossing roll was a nominal 20 percent of the total surface area of the composite. A pressure of 2070 kPa was maintained on the three layers to heat bond the layers to form a three-layer nonwoven web composite at a speed of 0.5 m/s. Physical properties and Runoff, Strikethrough and Rewet measurements for two different total basis weight three-layer nonwoven web composites are given in Table VIII below.

TABLE VIII

| Three-layer Nonwoven Web Composites Product physical characteristics | | |
|---|---|---|
| Basis weight, g/m² | 25 | 35 |
| Thickness, mm | 0.21 | 0.32 |
| Strip tensile MD, g | 840 | 1140 |
| CD, g | 460 | 1120 |
| Elongation MD, % | 38 | 48 |
| CD, % | 37 | 95 |
| Runoff, % | 43 | 43 |
| Strikethrough, sec | 3.42 | 4.23 |

TABLE VIII-continued

| Three-layer Nonwoven Web Composites Product physical characteristics | | |
|---|---|---|
| Rewet, g | 0.038 | 0.11 |

EXAMPLE 4

A three-layer nonwoven web composite was made using carded web for the two outer layers and a uniform basis weight self-bonded, fibrous nonwoven web for the intermediate layer. The self-bonded, nonwoven web was prepared in the form of a two-ply web from a polypropylene having a nominal melt flow rate of 35 g/10 min and had a nominal uniform basis weight of 17 g/m² with a BWUl and standard deviation of basis weight similar to the self-bonded web described in Tables I and II and was wound on a roll. The carded webs were prepared on a carded fiber line from a polypropylene having a melt flow rate of 31 g/10 min and had basis weights of 8.5 g/m². The self-bonded web was fed to a carded web line and thermobonded on an in-line 116.8-cm wide calender with a hard steel, embossed calender roll temperature maintained at 135° C., and a hard steel, smooth calender roll temperature maintained at 134° C. The bonding area of the embossing roll was a nominal 20 percent of the total surface area of the composite. A pressure of 2070 kPa was maintained on the three layers to heat bond the layers to form a three-layer nonwoven web composite at a speed of 0.5 m/s. The physical properties and Runoff, Strikethrough and Rewet measurements for the three-layer nonwoven web composite are given in Table IX below.

TABLE IX

| Three-layer Nonwoven Web Composite Product physical characteristics | |
|---|---|
| Basis weight, g/m² | 40 |
| Thickness, mm | 0.35 |
| Strip tensile MD, g | 1410 |
| CD, g | 430 |
| Elongation MD, % | 46 |
| CD, % | 114 |
| Runoff, % | 100 |
| Strikethrough, sec | 5.13 |
| Rewet, g | 0.13 |

EXAMPLE 5

A three-layer nonwoven web composite was made using a carded web for one layer and uniform basis weight self-bonded, fibrous nonwoven webs for the other two layers. The carded web was prepared on a carded fiber line from a staple fiber made from a polypropylene having a melt flow rate of 31 g/10 min and had a nominal basis weigth of 8.5 g/m². The staple fiber in the carded web had a length of 3.8 cm, a denier of 1.8 and a fiber melt flow rate of 45. The self-bonded nonwoven webs were prepared in the form of two-ply webs from a polypropylene having a nominal melt flow rate of 35 g/10 min, and had nominal uniform basis weights of 4.2 g/m² with BWUls and standard deviations of basis weight similar to the self-bonded web described in Tables I and II and were wound onto rolls. The self-bonded webs were fed together to the carded web line and thermobonded on an in-line 116.8-cm wide calender with a hard steel, embossed calender roll temperature maintained at 152° C., and a hard steel, smooth calender roll temperature maintained at 129.5° C. The bonding area of the embossing roll was a nominal 20 percent of the total surface area of the composite. A pressure of 2070 kPa was maintained on the three layers to heat bond the layers to form a three-layer nonwoven web composite at a speed of 0.5 m/s. The physical properties for the three-layer nonwoven web composite are given in Table X below.

TABLE X

| Three-layer Nonwoven Web Composite | |
|---|---|
| Product physical characteristics | |
| Basis weight, g/m² | 18.7 |
| Thickness, mm | 0.17 |
| Grab tensile MD, g | 1226 |
| CD, g | 428 |
| Elongation MD, % | 44 |
| CD, % | 70 |

EXAMPLE 6

Two- and three-layer nonwoven web composites were made using carded webs for one or two layers and a uniform basis weight self-bonded, fibrous nonwoven web for one layer. The carded webs were prepared on a carded fiber line from staple fiber made from a polypropylene having a melt flow rate of 31 g/10 min and they had a nominal basis weights of 17 and 34 g/m². The staple fiber in the carded web had a length of 3.8 cm, a denier of 1.8 and fiber melt flow rates of 35–45. The self-bonded nonwoven webs were RFX ™ Fabrics, available from Amoco Fabrics and Fibers Co., prepared in the form of multiple two-ply webs from a polypropylene having a nominal melt flow rate of 35 g/10 min and had nominal uniform basis weights of 17 and 34 g/m² with BWUIs and standard deviations of basis weight similar to the self-bonded web described in Tables I and II and and were wound onto rolls. Composite materials were formed at 0.3 m/s by manually combining layers of the carded web and the RFX ™ Fabric and feeding these layers to a Honeycomb Hydroentangler which had three headers, each header had one row of nozzles with each nozzle having a hole diameter of 0.005 inch with 40 holes per inch. The composite layers were bonded together by hydroentangling in single and double passes and dried in a thru air dryer. The composite constructions bonded by hydroentangling are described in Table XI below:

TABLE XI

| Hydroentangled Composites |
|---|
| Sample 1 Layer of carded web having a 17 g/m² basis weight and a layer of 17 g/m² basis weight RFX ™ Fabric. |
| Sample 2 Layer of carded web having a 34 g/m² basis weight and a layer of 17 g/m² basis weight RFX ™ Fabric. |
| Sample 3 Layer of carded web having a 17 g/m² basis weight and a layer of 34 g/m² basis weight RFX ™ Fabric. |
| Sample 4 Layer of carded web having a 34 g/m² basis weight, a layer of 17 g/m² basis weight RFX ™ Fabric and a layer of carded web having a 34 g/m² basis weight. |
| Sample 5 Layer of carded web having a 17 g/m² basis weight, a layer of 17 g/m² basis weight RFX ™ Fabric and a layer of carded web having a 17 g/m² basis weight. |

Samples 1–5 were each run through the Honeycomb Hydroentangler with a one-pass and two different two-pass bonding trails. The header pressures were:

| Number of Passes | Header Number | First Pass Pressure, psi | Second Pass Pressure, psi |
|---|---|---|---|
| One-pass | 1 | 500 | — |
| | 2 | 1000 | — |
| | 3 | 1500 | — |
| Two-pass (A) | 1 | 500 | 500 |
| | 2 | 1000 | 1000 |
| | 3 | 1500 | 1500 |
| Two-pass (B) | 1 | 500 | 1500 |
| | 2 | 1000 | 1500 |
| | 3 | 1500 | 1500 |

A qualitative analysis of the composites produced indicated that the two-pass hydroentangling trials produced a more complete bonding of the carded web to the self-bonded web.

That which is claimed is:

1. A multi-layer nonwoven web composite comprising,
   at least one layer of a uniform basis weight, self-bonded, fibrous, nonwoven web comprising a plurality of substantially randomly disposed, substantially continuous thermoplastic filaments wherein said web has a Basis Weight Uniformity Index of 1.0±0.05 determined from average basis weights having standard deviations of less than 10%, adhered to
   at least one layer of a carded web of staple fibers.

2. The composite of claim 1 wherein said self-bonded, fibrous, nonwoven web has a Basis Weight Uniformity Index of 1.0±0.03 determined from average basis weights having standard deviations of less than 10%.

3. The composite of claim 1 wherein said thermoplastic filaments of said self-bonded, fibrous, nonwoven web have deniers in the range of about 0.5 to about 20.

4. The composite of claim 1 wherein said thermoplastic filaments of said self-bonded, fibrous, nonwoven web comprise a thermoplastic selected from the group consisting of polyolefins, blends of polyolefins, polyamides and polyesters.

5. The composite of claim 4 wherein said thermoplastic filaments of said self-bonded, fibrous, nonwoven web comprise a polypropylene having a melt flow rate in the range of about 10 to about 80 g/10 min as measured by ASTM D-1238.

6. The composite of claim 4 wherein said thermoplastic filaments of said self-bonded, fibrous, nonwoven web comprise a blend of polypropylene and polybutene wherein said blend has a weight ratio of a polypropylene having a melt flow rate in the range of about 10 to about 80 g/10 min as measured by ASTM D-1238 in the range of about 0.99 to about 0.85 and a weight ratio of a polybutene having a number average molecular weight in the range of about 300 to about 2,500 in the range of about 0.01 to about 0.15.

7. The composite of claim 4 wherein said thermoplastic filaments of said self-bonded, fibrous, nonwoven web comprise a blend of polypropylene and linear low density polyethylene wherein said blend has a weight ratio of a polypropylene having a melt flow rate in the range of about 10 to about 80 g/10 min as measured by ASTM D-1238 in the range of about 0.99 to about 0.85 and a weight ratio of a linear low density polyethylene having a density in the range of about 0.91 to about 0.94 g/cc in the range of about 0.01 to about 0.15.

8. The composite of claim 1 wherein said staple fibers of said carded web comprise a material selected from the group consisting of cotton, polypropylene, blends of polypropylene and polybutene and blends of polypropylene and linear low density polyethylene.

9. The composite of claim 1 wherein said thermoplastic filaments of the self-bonded, fibrous, nonwoven web comprise a thermoplastic selected from the group consisting of polypropylene, blends of polypropylene and polybutene and blends of polypropylene and linear low density polyethylene and the self-bonded, fibrous, nonwoven web has a basis weight of about 3.5 g/m² or greater and said staple fibers of the carded web comprise a polypropylene and the carded web has a basis weight of about 3.5 g/m² or greater.

10. The composite of claim 9 wherein said composite comprises one layer of the self-bonded, fibrous, nonwoven web and one layer of the carded web.

11. The composite of claim 10 wherein said composite has a basis weight in the range of about 7 to about 100 g/m² and said thermoplastic filaments of the self-bonded, fibrous, nonwoven web comprise polypropylene.

12. The composite of claim 9 in the form of a diaper or hygienic product coverstock.

13. A multi-layer nonwoven web composite having improved crossmachine direction tensile strength per unit basis weight, improved rewet properties and a basis weight of about 7 g/m² or greater comprising,
   at least one layer of a uniform basis weight self-bonded, fibrous nonwoven web comprising a plurality of substantially randomly disposed, substantially continuous thermoplastic filaments wherein said filaments have deniers in the range of about 0.5 to about 20, said self-bonded, fibrous nonwoven web has a basis weight of about 3.5 g/m² or greater and a Basis Weight Uniformity Index of 1.0±0.05 determined from average basis weights having standard deviations of less than 10%, bonded to
   at least one layer of a carded web of thermoplastic staple fibers having a basis weight of about 3.5 g/m² or greater.

14. The composite of claim 13 wherein said thermoplastic filaments of the self-bonded, fibrous nonwoven web comprise a thermoplastic selected from the group consisting of polypropylene, high-density polyethylene, low density polyethylene, linear low density polyethylene, blends of polypropylene and polybutene and blends of polypropylene and linear low density polyethylene.

15. The composite of claim 13 wherein said staple fibers of the carded web comprise a thermoplastic selected from the group consisting of polypropylene, blends of polypropylene and polybutene and blends of polypropylene and linear low density polyethylene.

16. The composite of claim 13 wherein said thermoplastic filaments of the self-bonded, fibrous nonwoven web comprise a blend of polypropylene and linear low density polyethylene.

17. A multi-layer nonwoven web composite comprising at least one layer of a uniform basis weight self-bonded, fibrous nonwoven web and at least one layer of a carded web of staple fibers produced by the process comprising,
   bonding said one or more layers of the uniform basis weight self-bonded, fibrous nonwoven web comprising a plurality of substantially randomly disposed, substantially continuous thermoplastic filaments wherein said filaments have deniers in the range of about 0.5 to about 20 and said self-bonded, fibrous nonwoven web has a basis weight of about 3.5 g/m² or greater and a Basis Weight Uniformity Index of 1.0±0.05 determined from average basis weights having standard deviations of less than 10%, to
   said one or more layers of the carded web of thermoplastic staple fibers having a basis weight of about 3.5 g/m² or greater by thermal bonding or hydroentangling.

18. A method of making a multi-layer nonwoven web composite comprising,
   bonding to at least one layer of a uniform basis weight self-bonded, fibrous nonwoven web comprising a plurality of substantially randomly disposed, substantially continuous thermoplastic filaments wherein said web has a Basis Weight Uniformity Index of 1.0±0.05 determined from average basis weights having standard deviations of less than 10%,
   at least one layer of a carded web of thermoplastic staple fibers.

19. The method of claim 18 wherein said self-bonded, fibrous nonwoven web and said carded web comprise a polypropylene having a melt flow rate in the range of about 10 to about 80 g/10 min as measured by ASTM D-1238 and said bonding comprises providing said self-bonded, fibrous nonwoven web having a basis weight of about 3.5 g/m² or greater and said carded web having a basis weight of about 3.5 g/m² or greater to a calender at a speed of about 0.05 to about 7.5 m/s wherein said calender has an embossing roll maintained at a temperature in the range of about 105° to about 235° C. and a smooth roll maintained at a temperature in the range of about 105° to about 235° C. and a pressure maintained between said embossing roll and said smooth roll of about 10 to about 1000 pounds per linear inch.

20. The method of claim 18 wherein said bonding comprises hydroentangling said carded web to said self-bonded, fibrous nonwoven web.

* * * * *